United States Patent
Comstock et al.

(10) Patent No.: US 7,798,510 B2
(45) Date of Patent: Sep. 21, 2010

(54) MULTI-WHEELED VEHICLE

(76) Inventors: Scott Patrick Comstock, 4747 Gould Ave., La Canada, CA (US) 91011; Kurt Joseph Comstock, 13850 Lakeside St., Sylmar, CA (US) 91342

(*) Notice: Subject to any disclaimer, the term of this patent is extended or adjusted under 35 U.S.C. 154(b) by 12 days.

(21) Appl. No.: 11/905,610

(22) Filed: Oct. 2, 2007

(65) Prior Publication Data

US 2008/0197599 A1 Aug. 21, 2008

Related U.S. Application Data

(60) Provisional application No. 60/901,823, filed on Feb. 15, 2007.

(51) Int. Cl.
*B62K 17/00* (2006.01)
(52) U.S. Cl. .............. 280/266; 280/235; 280/240; 280/263; 280/270; 280/274; 280/282
(58) Field of Classification Search .......... 280/266, 280/263, 235, 282, 270, 240
See application file for complete search history.

(56) References Cited

U.S. PATENT DOCUMENTS

| | | | |
|---|---|---|---|
| 110,057 A | 12/1870 | Maltby | |
| 246,682 A | 9/1881 | Lorenzo | |
| 378,253 A | 2/1888 | Latta | |
| 633,746 A | 9/1899 | Anderson | |
| 958,618 A | 5/1910 | Franklin | |
| 2,950,127 A * | 8/1960 | Phillips | 280/304 |
| 3,083,036 A * | 3/1963 | Cornell, III et al. | 280/205 |
| D206,334 S | 11/1966 | Ryan et al. | |
| 3,724,873 A | 4/1973 | Glamb et al. | |
| D231,442 S | 4/1974 | Douglas et al. | |
| 3,829,127 A | 8/1974 | McLellan | |
| 3,860,264 A * | 1/1975 | Douglas et al. | 280/266 |
| 4,506,902 A | 3/1985 | Maebe | |

(Continued)

FOREIGN PATENT DOCUMENTS

JP 2-156815 6/1990

(Continued)

OTHER PUBLICATIONS

Ekib, "Making unloved bicycles more interesting", Designing cycling solutions, http://homepages.nildram.co.uk/~talizmar/xntrick/ekib.htm, XnTRICK Cycles, pp. 1 of 5.

(Continued)

*Primary Examiner*—Lesley D Morris
*Assistant Examiner*—Tashiana Adams
(74) *Attorney, Agent, or Firm*—The Law Offices of Michael E. Kondoudis

(57) ABSTRACT

A vehicle including: a front wheel; two rear wheels; a seat configured to allow a rider to lean forward when the vehicle travels; and a frame that includes a front frame section and a rear frame section, the front frame section extending from the seat to at least an axis of rotation of the front wheel and connecting the seat to the front wheel, the rear frame section extending from the first frame section rearward and connecting the rear wheels to the first frame section, the frame sections being pivotably connected at a pivot point between the main wheel and the seat.

19 Claims, 9 Drawing Sheets

U.S. PATENT DOCUMENTS

| | | | | |
|---|---|---|---|---|
| 4,657,272 A * | 4/1987 | Davenport | ............... | 280/266 |
| 4,746,132 A * | 5/1988 | Eagan | ............... | 280/1.13 |
| 4,863,182 A * | 9/1989 | Chern | ............... | 280/266 |
| 4,971,342 A * | 11/1990 | Dix et al. | ............... | 280/1.13 |
| 5,135,248 A * | 8/1992 | Keiserman | ............... | 280/432 |
| 5,382,038 A * | 1/1995 | Allsop et al. | ............... | 280/281.1 |
| 5,454,579 A * | 10/1995 | Chen | ............... | 280/205 |
| 5,701,965 A * | 12/1997 | Kamen et al. | ............... | 180/7.1 |
| 5,730,453 A * | 3/1998 | Owsen | ............... | 280/282 |
| 5,791,425 A * | 8/1998 | Kamen et al. | ............... | 180/7.1 |
| 5,868,413 A * | 2/1999 | Cabrera | ............... | 280/205 |
| 5,971,091 A * | 10/1999 | Kamen et al. | ............... | 180/218 |
| 6,257,611 B1 * | 7/2001 | Muldoon | ............... | 280/442 |
| 6,299,189 B1 * | 10/2001 | Chao | ............... | 280/220 |
| 6,302,230 B1 * | 10/2001 | Kamen et al. | ............... | 180/171 |
| 6,367,817 B1 * | 4/2002 | Kamen et al. | ............... | 280/5.507 |
| 6,371,916 B1 * | 4/2002 | Buhler et al. | ............... | 600/449 |
| 6,520,527 B2 * | 2/2003 | Laarman | ............... | 280/437 |
| 6,538,411 B1 * | 3/2003 | Field et al. | ............... | 318/638 |
| 6,581,714 B1 * | 6/2003 | Kamen et al. | ............... | 180/333 |
| 6,651,766 B2 * | 11/2003 | Kamen et al. | ............... | 180/218 |
| 6,659,488 B1 | 12/2003 | Beresnitzky et al. | | |
| 6,666,469 B2 * | 12/2003 | Yu et al. | ............... | 280/274 |
| 6,726,234 B2 * | 4/2004 | Lund | ............... | 280/438.1 |
| 6,779,621 B2 * | 8/2004 | Kamen et al. | ............... | 180/282 |
| 6,789,640 B1 * | 9/2004 | Arling et al. | ............... | 180/282 |
| 6,796,396 B2 * | 9/2004 | Kamen et al. | ............... | 180/272 |
| 6,815,919 B2 * | 11/2004 | Field et al. | ............... | 318/587 |
| 6,827,163 B2 * | 12/2004 | Amsbury et al. | ............... | 180/7.1 |
| 6,866,107 B2 * | 3/2005 | Heinzmann et al. | ............... | 180/7.1 |
| 6,868,931 B2 * | 3/2005 | Morrell et al. | ............... | 180/170 |
| 6,874,591 B2 * | 4/2005 | Morrell et al. | ............... | 180/179 |
| 6,915,878 B2 * | 7/2005 | Kamen et al. | ............... | 182/141 |
| 6,965,206 B2 * | 11/2005 | Kamen et al. | ............... | 318/139 |
| 6,969,079 B2 * | 11/2005 | Kamen et al. | ............... | 280/204 |
| 7,000,933 B2 * | 2/2006 | Arling et al. | ............... | 280/204 |
| 7,004,271 B1 * | 2/2006 | Kamen et al. | ............... | 180/21 |
| 7,023,330 B2 * | 4/2006 | Kamen et al. | ............... | 340/427 |
| 7,055,841 B2 | 6/2006 | Buhrman | | |
| 7,090,040 B2 * | 8/2006 | Kamen et al. | ............... | 180/7.1 |
| 7,157,875 B2 * | 1/2007 | Kamen et al. | ............... | 318/434 |
| 7,159,882 B2 * | 1/2007 | Buhrman | ............... | 280/263 |
| 7,174,976 B2 * | 2/2007 | Kamen et al. | ............... | 180/19.1 |
| 7,182,166 B2 * | 2/2007 | Gray et al. | ............... | 180/209 |
| 7,210,544 B2 * | 5/2007 | Kamen et al. | ............... | 180/7.1 |
| 7,275,607 B2 * | 10/2007 | Kamen et al. | ............... | 180/7.1 |
| 7,370,713 B1 * | 5/2008 | Kamen | ............... | 180/7.1 |
| 7,407,175 B2 * | 8/2008 | Kamen et al. | ............... | 280/204 |
| 7,479,872 B2 * | 1/2009 | Kamen et al. | ............... | 340/427 |
| 7,537,229 B1 * | 5/2009 | Wu | ............... | 280/205 |
| 7,546,889 B2 * | 6/2009 | Kamen et al. | ............... | 180/7.1 |
| 2003/0042701 A1 * | 3/2003 | Chen et al. | ............... | 280/270 |
| 2004/0104555 A1 * | 6/2004 | Atley | ............... | 280/426 |
| 2004/0245742 A1 * | 12/2004 | Buhrman | ............... | 280/263 |

FOREIGN PATENT DOCUMENTS

| | | |
|---|---|---|
| JP | 03-000765 | 1/1991 |
| JP | 2002-362461 | 12/2002 |
| WO | WO 98/21081 | 5/1998 |

OTHER PUBLICATIONS

International Preliminary Report on Patentability in related international application No. PCT/US2008/053711 completed May 26, 2009.

\* cited by examiner (A)    (B)

MULTI-WHEELED VEHICLE

CROSS-REFERENCE TO RELATED APPLICATION

This application claims the priority of U.S. Provisional Patent Application No. 60/901,823, filed Feb. 15, 2007, the disclosure of which is incorporated herein by reference.

BACKGROUND

The present invention relates generally to multi-wheeled vehicles, and more particularly, to a three-wheeled, seat-steered vehicle.

Numerous types of wheeled vehicles are known. Such vehicles may be pedal driven and/or motorized. The stability, skill necessary to ride, and maneuverability of these vehicles is a function of the number of wheels employed. Generally, the greater the number of wheels employed, the more stable a vehicle is. And, the more stable a vehicle is, the less skill is required to successfully ride it. However, with increased stability comes decreased maneuverability. Accordingly, it can be useful to differentiate wheeled vehicles based on the number of wheels, since this number affects operational characteristics of the vehicle.

A vehicle using two wheels and consisting of a frame mounted between the two wheels is generally known as bicycle. Typically, a bicycle includes front and rear wheels mounted to the frame, a seat on the frame and between the wheels, a pair of pedals operably connected to the rear wheel by a chain loop, and a hand operated steering arrangement that includes handle bars that turn a fork to which the front wheel is attached. To steer a bicycle, a rider leans to a side so that the center of gravity shifts to that side of the bicycle while simultaneously turning the handlebars to direct the fork toward that side so as to bring the center of gravity back in line with the wheels. Bicycles tend to be fairly stable since the center of gravity can usually only shift laterally (side to side) and because a rider tends to lean forward to hold the handlebars.

A vehicle using a single wheel is known as a unicycle. Typically, a unicycle includes a frame mounted over the single wheel with a fork at a lower end and a saddle (seat) at the upper end. The wheel is driven by a pair of pedals connected to the wheel at its central axis. Unicycles do not require hand operated steering and do not include a hand operated steering mechanism. Instead, a rider steers a unicycle by twisting at the waist, pivoting the unicycle to the desired direction and selectively pedaling. Unicycles are less stable than bicycles because the center of gravity of a unicycle can shift laterally as well as longitudinally (frontwards and rearwards). This instability makes unicycles more maneuverable than bicycles and, as a result, they require a greater skill to ride.

A vehicle using three wheels is known as a tricycle. Typically, a tricycle includes three wheels mounted to a frame in a staggered configuration such that one larger, forward wheel, which has attached pedals, is located between two smaller, rear wheels. Tricycles also include a hand operated steering arrangement that includes handle bars that turn a fork to which the front wheel is attached. This wheel configuration provides three staggered points of support, which define a plane. The rider sits on a seat on the frame and between the wheels and steers the tricycle by turning the fork via the handlebars. Tricycles are even more stable than bicycles in part because the center of gravity generally remains fixed. As a result, tricycles are less maneuverable than bicycles and require the lowest degree of skill to ride.

The present invention, as claimed herein, unique in structure and arrangement, provides a multi-wheeled vehicle in which a frame may be selectively articulated to steer the vehicle without the need for a hand operated steering or other form of steering mechanism. This structure and arrangement yields a maneuverable yet stable vehicle. Thus, this structure and arrangement facilitates enhanced maneuverability and operability of the vehicle without increasing the degree of skill necessary to ride it.

BRIEF SUMMARY

An aspect of the present invention provides a vehicle including: a front wheel; two rear wheels; a seat configured to allow a rider to lean forward when the vehicle travels; and a frame. The frame includes a front frame section and a rear frame section, the front frame section extending from the seat to at least an axis of rotation of the front wheel and connecting the seat to the front wheel, the rear frame section extending from the front frame section rearward and connecting the rear wheels to the front frame section, the frame sections being pivotably connected at a pivot point between the main wheel and the seat.

Another aspect of the present invention provides a vehicle including: a frame including a connection point to which a steering assembly is rotatably connectable, a first frame section extending away from the connection point, and a second frame section connected to the first frame section at an end opposite the connection point and to which a pair of wheels are connected; and a steering assembly rotatably connected to the frame at the connection point and including a seat configured to allow a rider to lean forward when the vehicle travels, and a fork connected to a drive wheel at the connection point and in a fixed relationship with the seat, the connection point being between the drive wheel and the seat. When a rider seated on the seat drives the drive wheel the vehicle travels in a forward direction or a backward direction. When a torque is applied to the seat, the seat and drive wheel turn.

Still another aspect of the present invention provides a vehicle including: a seat permitting a rider to lean forward when the vehicle travels and which is rotatable about an axis in response to an applied torque; a fork section having a fork accommodating a main wheel and a stem extending from fork to the seat; and a frame section having an articulation section movably connected to the stem at an end, a connection member extending from the articulation section away from the main wheel, and a shaft rigidly connected to the connection member at another end of the frame section, respective ones of a pair of auxiliary wheels being connected to opposing ends of the shaft. And, when the seat is rotated, the main wheel rotates about the axis.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of an embodiment thereof made in conjunction with the accompanying drawings of which.

DETAILED DESCRIPTION OF EMBODIMENT

Figure 1:
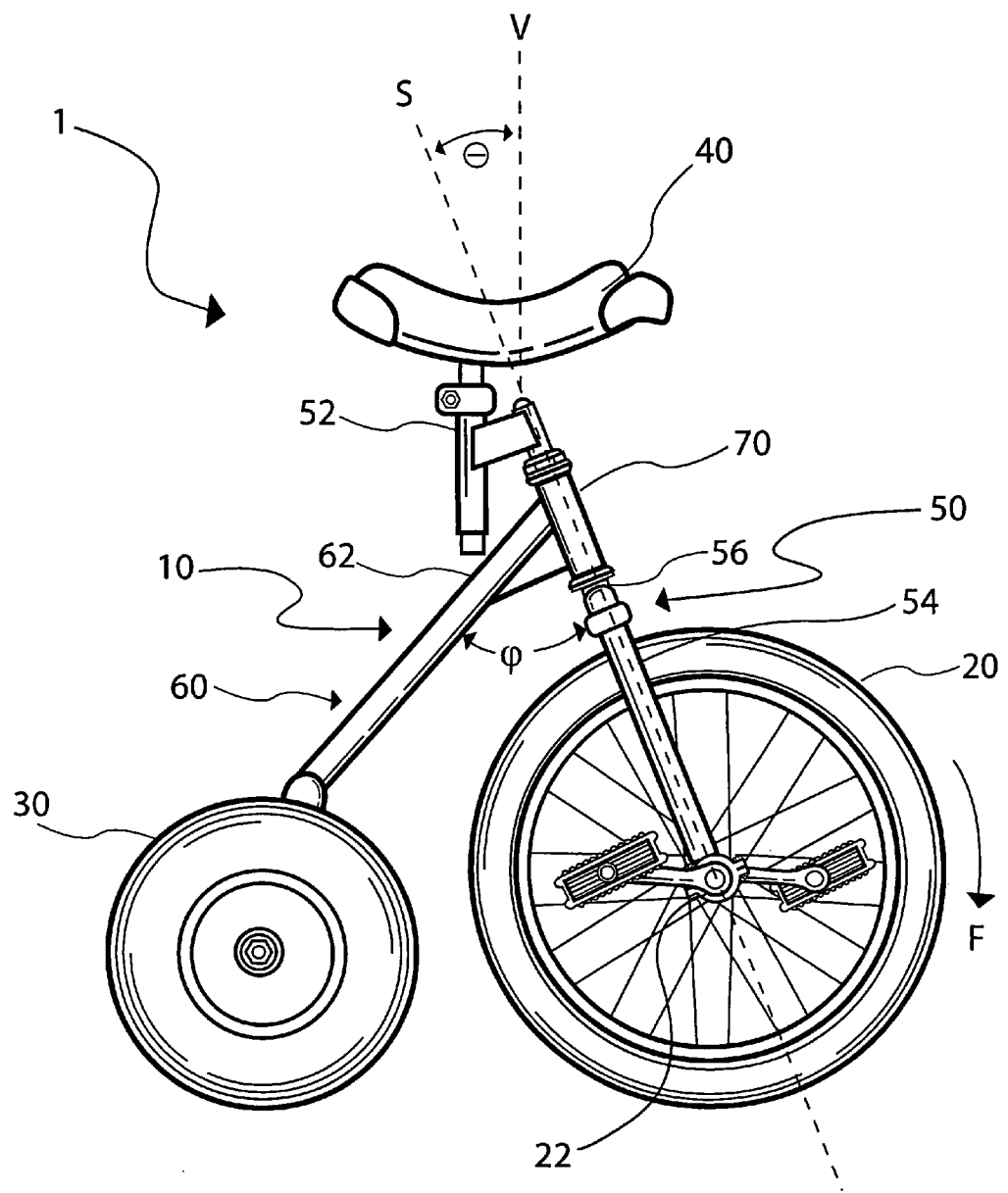
FIG. 1 is a side view of a multi-wheeled vehicle according to an embodiment of the present invention.

Reference will now be made in detail to an embodiment of the present invention, examples of which are illustrated in the accompanying figures, wherein like reference numerals refer to the like elements throughout. The embodiment is described below in order to explain the present invention with concurrent reference to the figures.

To better facilitate an understanding of the disclosed embodiment of the present invention, it may be useful to define relative directional terms that will be used herein. As used herein, "front" and "forward" relate to a preferred direction of travel of the multi-wheeled device of the described embodiment. The preferred direction of travel is to the right of the vehicle as the vehicle is illustrated in FIG. 1. "Rear" and "rearward" relate to a direction opposite the preferred direction of travel. "Upward" and "upwardly" relate to a direction away from the surface on which the vehicle travels. "Downward" and "downwardly" relate to a direction toward the surface on which the vehicle travels.

Figure 2:
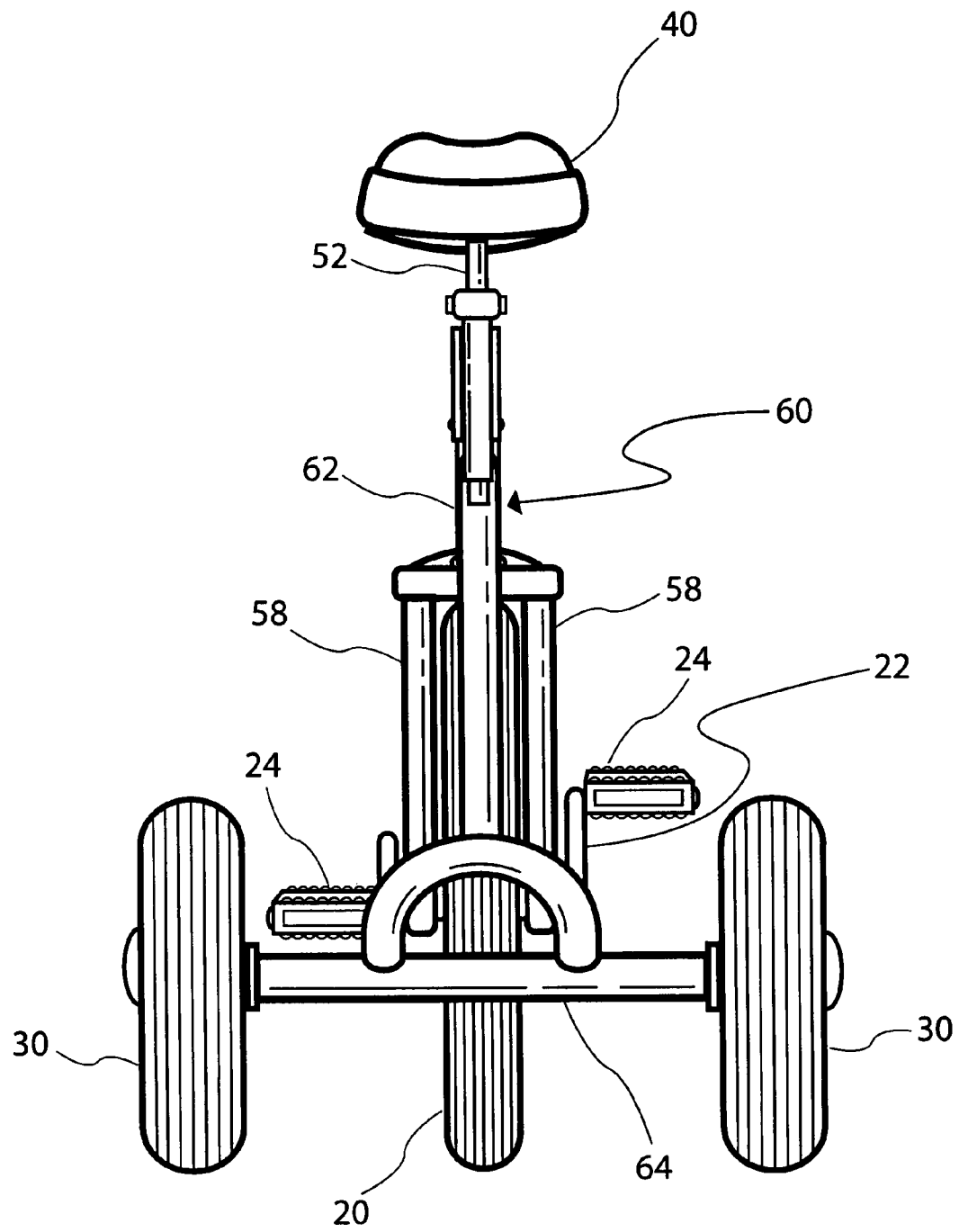
FIG. 2 is a rear view of the multi-wheeled device of FIG. 1.
Figure 3:
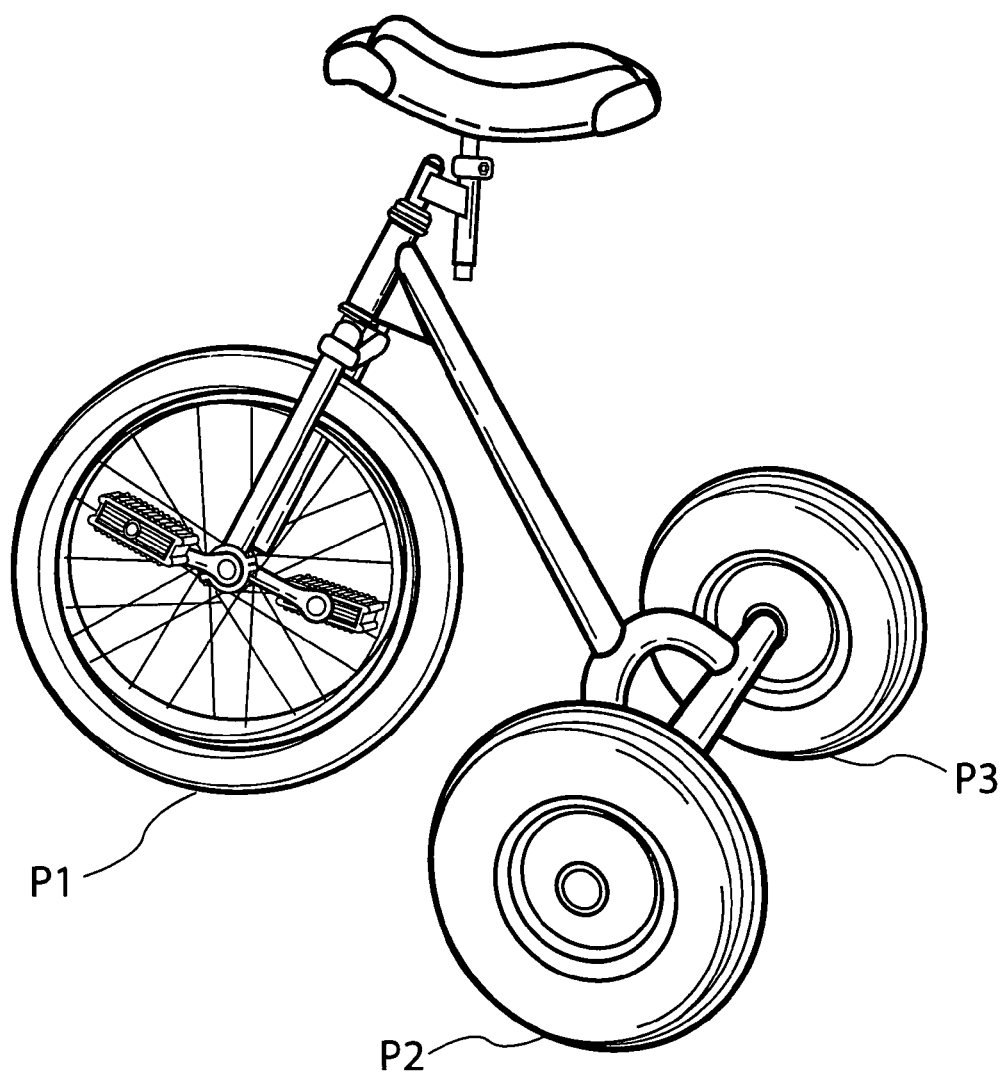
FIG. 3 is perspective view of the multi-wheeled vehicle of FIG. 1.

Referring to FIGS. 1-3, a multi-wheeled vehicle according to the disclosed embodiment includes a frame 10 on which a seat 40 is mounted and to which is mounted a front, main wheel 20 and a pair of rear, auxiliary wheels 30.

Figure 4:
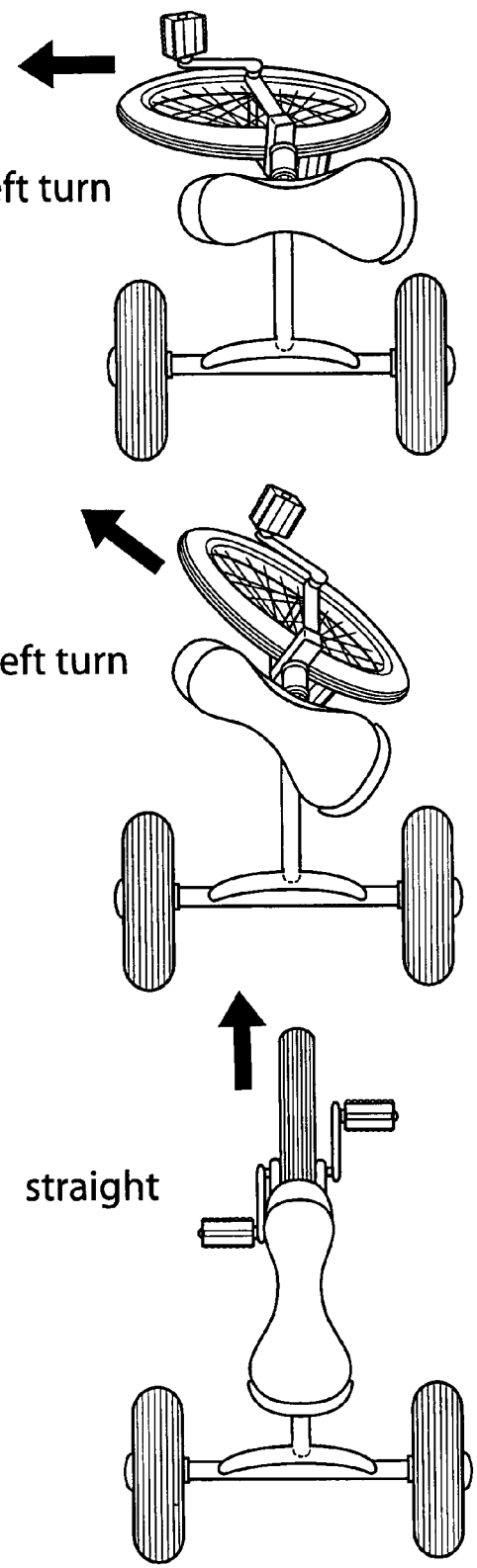
FIG. 4 is a top view of the multi-wheeled vehicle of FIG. 1 in a 45 degree and a 90 degree articulated condition.

The frame 10 includes two frame sections, a front frame section 50 and a rear frame section 60. The orientations of the front frame section 50 and the rear frame section 60 are selectively changeable with respect to each other. That is, as will be described in detail below, the frame 10 may be articulated at an articulation point 70 so that the front frame section 50 and the rear frame section 60 can rotate with respect to each other from an in-line straight forward orientation as shown in FIGS. 1-3 to a turning orientation as shown in FIG. 4. And, as FIG. 4 illustrates, the frame sections have a respective ranges of motion of 360 degrees.

The front frame section 50 interconnects the seat 40 and the main wheel 20. The front frame section 50 includes a seat post 52 connected to a fork 54 and is inclined with respect to vertical (indicated by line V in FIG. 1) by an angle Θ. Angle Θ may be, by way of a non-limiting example, between 15 and 30 degrees. This angle of inclination of the fork 54 ensures that the axis of rotation of the main wheel is forward of the longitudinal location of the center of gravity (indicated by line G in FIG. 5) of the vehicle and of an articulation point 70, as described in detail below.

Figure 8:
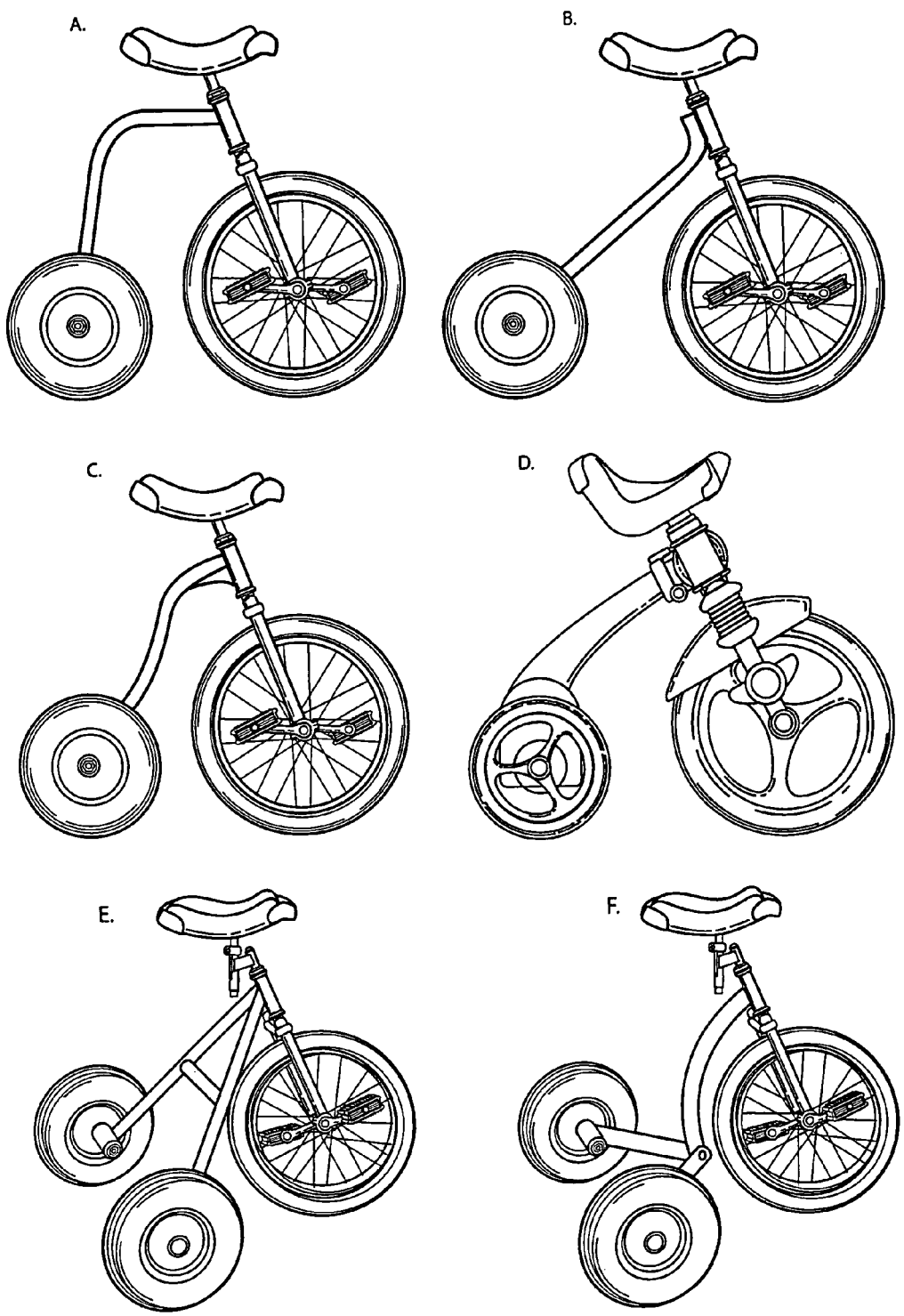
FIG. 8, parts (A)-(F), are views of various examples of the multi-wheeled vehicle according to the disclosed embodiment of FIG. 1 and/or other contemplated embodiments.

Further, as FIG. 1 best illustrates, the seat post 52 is cantilevered with respect to the fork 54. This cantilevered arrangement permits a rider to adjust a ride height and/or a distance from the axis of rotation of the main wheel 20 without changing the lateral or longitudinal location of the center of gravity. Rather, only the vertical location of the center of gravity changes. The ability to make these adjustments permits a rider to more comfortably ride and operate the vehicle. This cantilevered seat post, however, is optional. Indeed, it is to be understood that, in the alternative, the seat may sit on a seat post extending from the articulation section 70 along axis S. In this alternative arrangement, the seat post is adjustable in much the same way as the height of a handlebar neck on a bicycle is adjusted. This alternative arrangement is illustrated in parts (A)-(D) of FIG. 8.

Referring again to FIGS. 1-3, the fork 54 accommodates the main wheel 20 and is connected to the main wheel in a conventional manner such as, for example, a spindle assembly, so that the main wheel 20 may freely rotate when not in contact with a riding surface. The fork 54 includes a stem 56 and a pair of spaced blades 58 that extend downwardly from the stem in a side-by-side configuration. The blades 58 are sufficiently spaced apart so as to accommodate the front wheel 20 therebetween. Each blade 58 has a connector at a lower end to accept and retain an end the spindle. The connector 22 may accept and retain the spindle in a conventional manner such as, for example, by using dropouts at the ends of the blades 58. The stem 56 is connected to the blades 58 at an upper end of the blades opposite the axis of rotation of the main wheel 20 and extends upwardly to a connection with the seat post 52.

The front frame section 50, via the seat post 52 and the fork 54, interconnects the seat 40 with the main wheel 20 so that they share a common, fixed orientation. This shared orientation, as explained in more detail below, permits a rider to effect directional changes (to steer) the vehicle during use by selectively articulating the respective front and rear frame sections 50 and 60 relative to each other.

The rear frame section 60 connects the front frame section 50 to the auxiliary wheels 30 in an articulatable manner. The rear frame section 60 includes and the articulation section 70, a connection member 62, and a shaft 64.

The articulation section 70 is at a forward end of the rear frame section 60. The articulation section 70 provides selective articulation of the first frame section 50 relative to the second frame section 60. Of course, it is to be understood that this steering could be equally as accurately described as articulating the rear frame section 60 relative to the front frame section 50.

The articulation of the articulation section 70 can be achieved by various conventionally known arrangements such as, for example, a journal including a bearing sleeve within which the stem is rotatably or pivotably received, as illustrated in FIG. 1.

The articulation section 70 is located above and rearward (i.e., aft) the axis of rotation of the main wheel 20 relative to the preferred direction of travel, which is to the right of the vehicle 1 as the vehicle is oriented in FIG. 1.

The connection member 62 is rigidly connected to the articulation section 70 and extends rearward and downwardly from the articulation section to shaft 64, which is shown in FIG. 2, at an angle of φ. It is to be understood that the length, shape, and connection angle φ of the connection member 62 may vary so long as extends aft of the axis of rotation of the main wheel relative to the preferred direction of travel and facilitates mechanical communication between the articulation section 70 and the auxiliary wheels 30. Non-limiting examples of such variations are illustrated in parts (A)-(F) of FIG. 8.

The shaft 64 is rigidly attached to an end of the connection member 62. It is to be understood that various arrangements may be used to make this connection so long as the arrangement results in a rigid, fixed connection. Non-limiting examples of such variations are illustrated in parts (A)-(D) of FIG. 8. It is also to be understood, however, that the shaft 64 is optional and that the auxiliary wheels 30 may be connected directly to the connection member 62 or to respective connection members. Non-limiting examples of such variations are illustrated in parts (E) and (F) of FIG. 8.

At each end of the shaft 64 is an auxiliary wheel 30. The auxiliary wheels 30 are rotatably connected to the ends of the shaft 64. The auxiliary wheels 30 may be connected to the ends of shaft 64 by various conventionally known manners such as, for example, an axle extending to each auxiliary wheel through the shaft 64.

Each auxiliary wheel 30 is located at a respective side of the front frame section 50. The auxiliary wheels 30 share a common diameter. The diameters of the auxiliary wheels 20 are less than that of the main wheel 20. It is to be understood, however, that the auxiliary wheels may, in the alternative, have diameters equal to or greater than that of the main wheel 20. The axes of rotation of the main wheel 20 and the auxiliary wheels 30 are parallel and horizontal when the vehicle 10 is traveling straight forward, as the vehicle 1 is illustrated in FIG. 1. And, when the frame 10 is articulated as illustrated in FIG. 4, the axes are not parallel.

As described above, the frame 10 mounts a single main wheel 20 at the front of the vehicle 10 and a pair of auxiliary wheels 30 at the rear of the vehicle. The wheels, as best illustrated by FIG. 3, provide three points of contact P1-P3 with the surface on which the vehicle travels. As is known in the art, three points of support define a plane, which is inherently more stable than a straight line of support defined by two points of support or a single point of support.

Optionally, as illustrated in FIGS. 1-3, a crank 22 with pedals 24 are attached to, or formed with, the axle of front wheel 20. The crank 22 and pedals 24 permit a rider to apply generally downwardly directed foot pressure to the pedals and turn the main wheel 20. This rotational motion, in turn, is translated into linear motion of the vehicle. In the alternative, the main wheel 20 may be driven by a motor, in a conventionally known manner. When the main wheel 20 is driven by a motor, the crank 22 and the pedals 24 may be replaced by foot rests (not illustrated).

The seat 40 and the front frame section 50 are together a steering arrangement. As described above, the seat 40 and main wheel 20 share a fixed, common orientation. Further, since both the seat post 52 and the fork 54 are connected to the stem 56, the seat 40 and the fork 54 holding the main wheel 20 rotate about the same axis indicated by line S in FIG. 1. Thus, when the seat 40 rotates about axis S, so too does the fork 54. And, because of this configuration, main wheel 20, disposed in the front region of the frame 10, is steerable by turning the seat 40.

Figure 6:
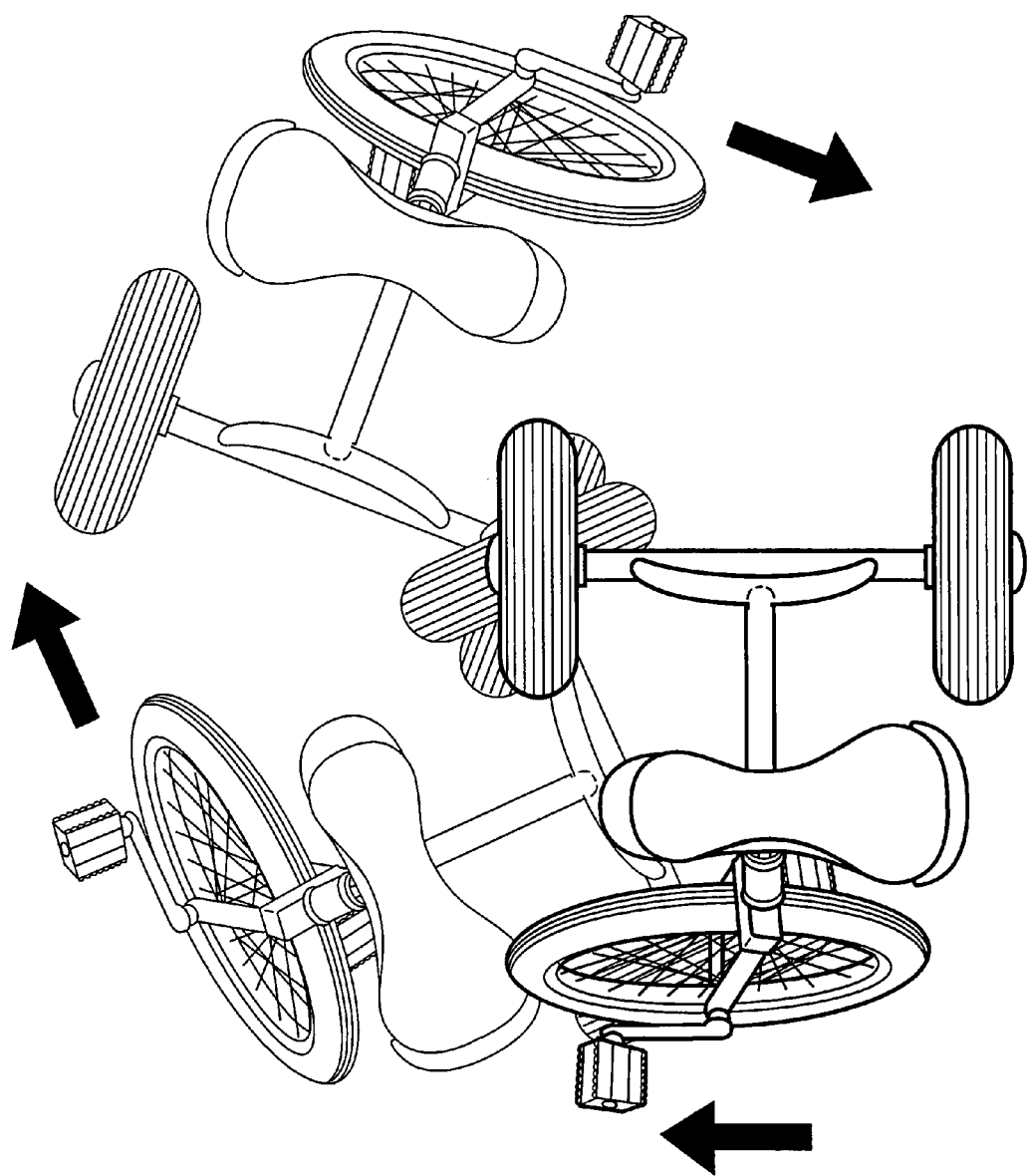
FIG. 6 is a view illustrating the unexpected maneuverability of the multi-wheeled vehicle of FIG. 1.

Referring again to FIG. 4, there is shown a top plan view of the vehicle 1 illustrating the displacement of the main wheel 20 and the auxiliary wheels 30 in response to an articulation of the front frame section 50 relative to the rear frame section about articulation point 70 resulting from a turning of seat 40 about axis S of FIG. 1. As explained above, when a rider causes the seat 40 to turn the fork 54 turns in concert with the seat. So, for example, when the rider causes the seat 40 to turn clockwise about axis S as the vehicle 1 is illustrated in FIG. 4, the fork 54 also turns clockwise about axis S. The turning of the fork 54 changes the direction of the main wheel 20 accommodated therein. In this condition, there is a relative displacement of the axis of rotation of main wheel 20 and the axis of rotation of the auxiliary wheels 30 from a parallel relation (during straight forward or straight rearward travel). Testing by the inventors has confirmed that this displacement, in combination with other features, allows the vehicle 1 to execute unexpectedly sharp turns. For example, as FIG. 6 illustrates, the vehicle 1 can execute a complete circle having a radius of about twice the width of the vehicle by turning at a r angle and pivoting on the inside wheel. This turn radius is both unexpected and superior to those found in the art. Further, this unexpected maneuverability yields a different kind riding experience than those provided by other vehicles. T The vehicle 1 permits a rider to more easily maintain a forward lean without the need for handlebars. More specifically, the seat 40 allows rider to lean forward regardless of the direction of travel. As is known in the art, leaning forward provides several advantages. For example, a forward lean facilitates balance and thus, successful operation. Traveling forward without leaning forward may lead to a loss of balance and a rearward fall.

Figure 5:
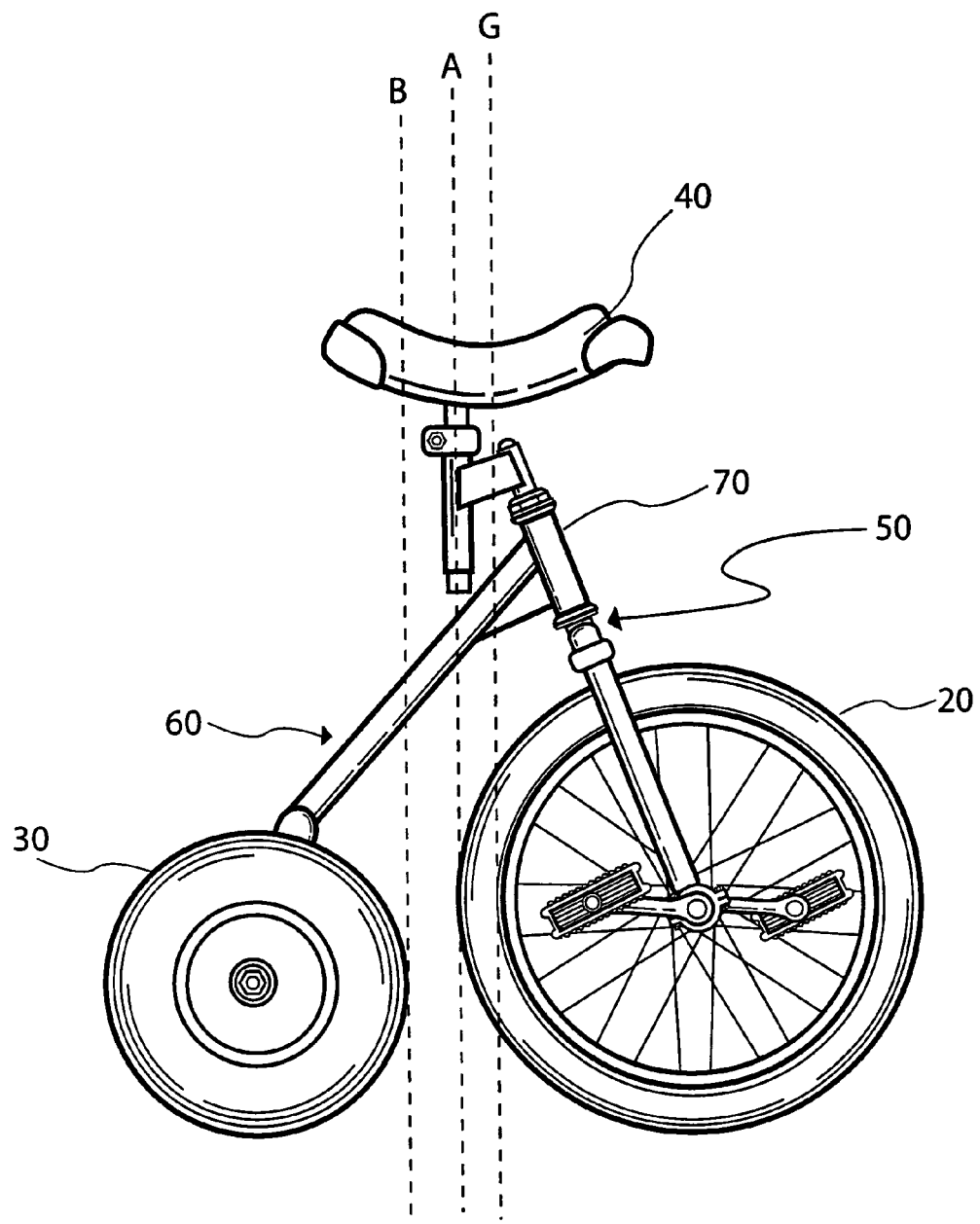
FIG. 5 is a view of the multi-wheeled vehicle of FIG. 3 illustrating the relative locations of the center of gravity of the vehicle, the axes of rotation of the wheels, and the articulation section.

Referring now to FIG. 5, various structural features that contribute to the maneuverability and stability of the vehicle of the descried embodiment are illustrated.

As FIG. 5 illustrates, the seat 40 is always above the wheels 20 and 30. Also, the seat 40 is positioned above and rearward of the main wheel 20 resulting in even weight distribution to the three wheels 20 and 30. And, the seat 40 is always at least partially over both the main wheel 20 and a cylinder defined by circumferences of the auxiliary wheels 30. This configuration ensures that the lateral and longitudinal position of the center of gravity (indicated by line G) remains between the points of support P1-P3 of wheels 20 and 30 shown in FIG. 4, which yields enhanced stability of the vehicle 1. This configuration also tends to lessen the pressure on point P1 of FIG. 4, making it easier to torque the seat 40 and turn main wheel 20.

Also, as FIG. 5 illustrates, the articulating section 70 is always above the main wheel 20 and between the axis of rotation of the main wheel and the longitudinal location of the center of gravity of the vehicle (indicated by line G). Further, the articulation section 70 is forward of the longitudinal position of the center of gravity of the vehicle when the vehicle is traveling in a forward direction and remains in the same location relative to the center of gravity regardless of the direction of travel. This configuration results in enhanced stability and predictability of the vehicle 1, lowering the level of skill necessary to ride the vehicle.

Operation of the vehicle of the disclosed embodiment will be explained.

To ride the vehicle 1, a rider sits on the seat 40 and places his/her feet on the pedals 24. In this condition, the rider can lean forward and initiate forward locomotion of the vehicle 1.

To achieve forward locomotion, the rider applies pressure to the pedals 24 and turns the crank 22 in a direction F shown in FIG. 1, which, in turn, rotates the main wheel 20 in the direction F. This rotation of the main wheel 20 in the direction F is translated into linear forward motion of the vehicle 1. Conversely, turning the crank 22 in a direction opposite of direction F is translated into rearward linear motion of the vehicle 1. In this way, the main wheel 20 is a drive wheel.

To change the traveling direction of the vehicle 1 (i.e., to steer the vehicle) the rider applies a torque to the seat 40. This torque articulates the front frame section 50 and the rear frame section 60 relative to each other, as shown by FIG. 4. The resulting angle of the frame sections relative to each other dictates the amount of change in the direction of the vehicle.

And, in this condition, when the vehicle is experiencing forward or rearward locomotion, the vehicle turns.

To apply the torque to the seat 40, the rider turns his upper body, shoulders and arms into the desired direction and then swivels his hips and pivots at the waist to cause his lower body, legs and feet to follow in the direction of the upper body. The lower body torque causes the set to rotate about axis S (shown in FIG. 1), which, in turn, causes the fork 56 to rotate about axis S in concert with the seat 40. The rider does not lean or shift his weight to initiate turning. Rather, like a unicycle, a rider of the vehicle 1 twists at the waist and pivots the lower body and seat and legs to steer the wheel into the desired direction. This is in contrast to known vehicles such as, for example, a bicycle, a skateboard, or even the velocipede that is disclosed in U.S. Pat. No. 3,860,264. Contemporaneously, the rider uses selective pedaling and leans or shifts his weight only to help maintain balance while in motion.

It has been found through testing that the positioning of the articulation section 70 as described above unexpectedly enhances both the stability and the maneuverability of the vehicle 1. In testing, Applicants varied the angles of $\Theta$ and $\phi$ in various testing configurations of the vehicle 1 so as to change, for example, the this angle of inclination of the fork 54 relative to vertical V. Representative samples of these testing configurations are illustrated in parts (A)-(C) of FIG. 7.

Figure 7:
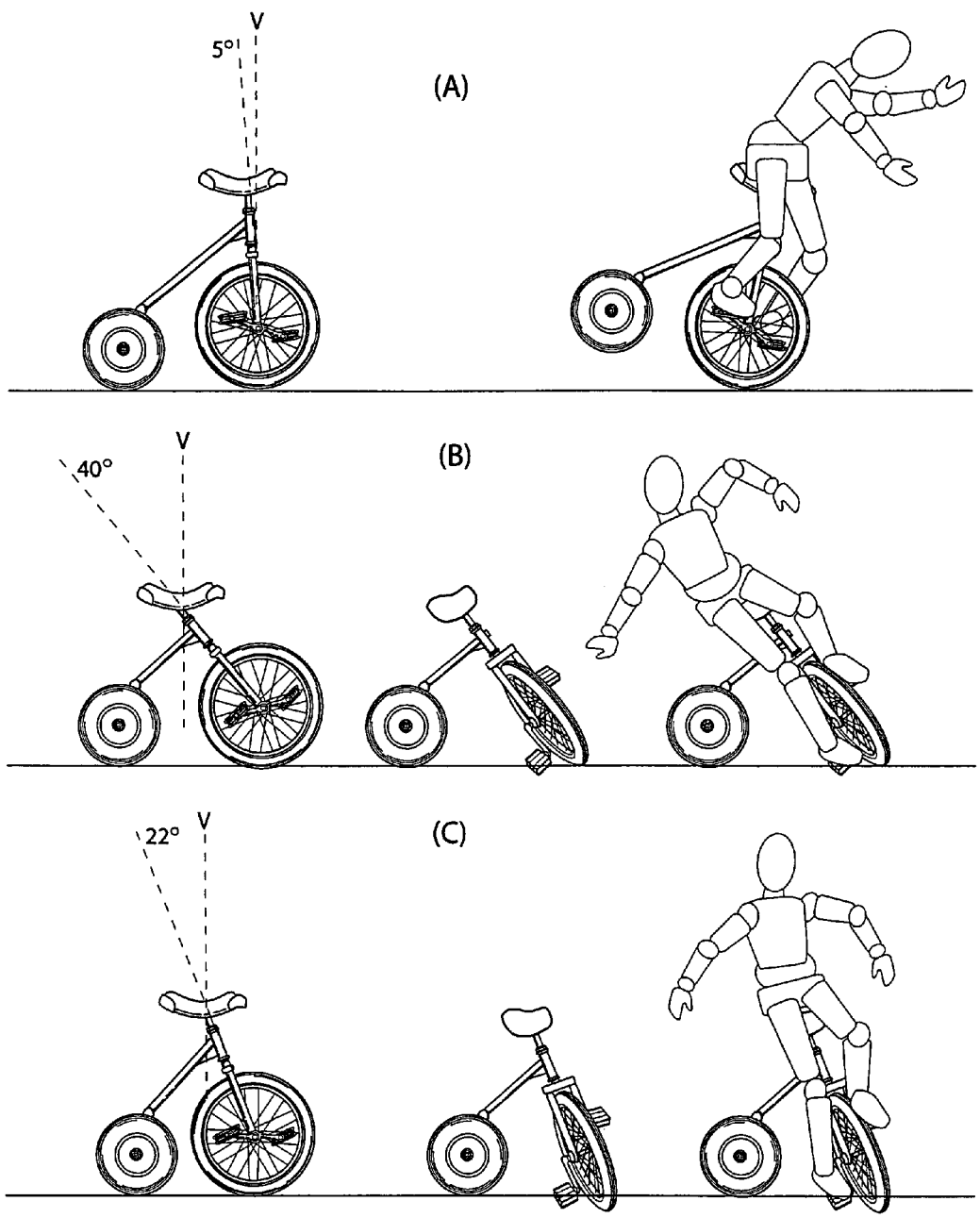
FIG. 7, parts (A)-(C), illustrates results of experimenting and testing of the multi-wheeled vehicle of FIG. 1 when the articulation section is modified.

Referring to part (A) of FIG. 7, this testing revealed that when $\Theta$, the angle of the articulation of the articulation section 70 (and thus the front frame 50) is small and the articulation section nears vertical, the center of gravity of the seat is too far forward for stable travel. In this configuration, more of the rider's weight is disproportionately placed on the front wheel and less on the rear wheels. With this arrangement, the rider and the vehicle tends to tip over forward when the rider leans forward or attempts to stop abruptly.

Referring to part (B) of FIG. 7, this testing revealed that when E) is greater than 30 degrees (e.g., 40 degrees) it is much more difficult for the rider to maintain balance of the vehicle.

Referring to part (C) of FIG. 7, it was discovered that when the angle $\Theta$ is between 15 and 25 degrees (e.g., 22 degrees) and the vehicle 1 s configured as illustrated in FIGS. 1-3, the rider's weight is more evenly distributed between all three wheels and the rider is able to lean forward while in motion and stop abruptly without the rider and vehicle tipping forward. Also, in this range, the articulation of section 70 advantageously tilts slightly into the direction of the turn, which makes it easier for the rider to lean into a turn and maintain balance.

The results illustrated in part (C) of FIG. 7 were unexpected and greatly increased the performance of the vehicle 1. In the configuration illustrated by part (C) of FIG. 7, the rider may lean and easily balance while making a 90 degree turn which pivots the vehicle on the inside rear wheel in order to make a turning radius only twice as wide as the vehicle, as illustrated in FIG. 6. This ease of use and/or unexpected maneuverability permits the vehicle 1 to outperform known vehicles.

Although an embodiment of the present invention have been shown and described, it is to be understood the present invention is not limited to the described embodiment. Instead, although the disclosed embodiment is presently believed to be the preferred embodiment, it is to be appreciated that changes may be made to this embodiment without departing from the principles and spirit of the invention, the scope of which is defined by the claims and the equivalents thereof.

Figure 9:
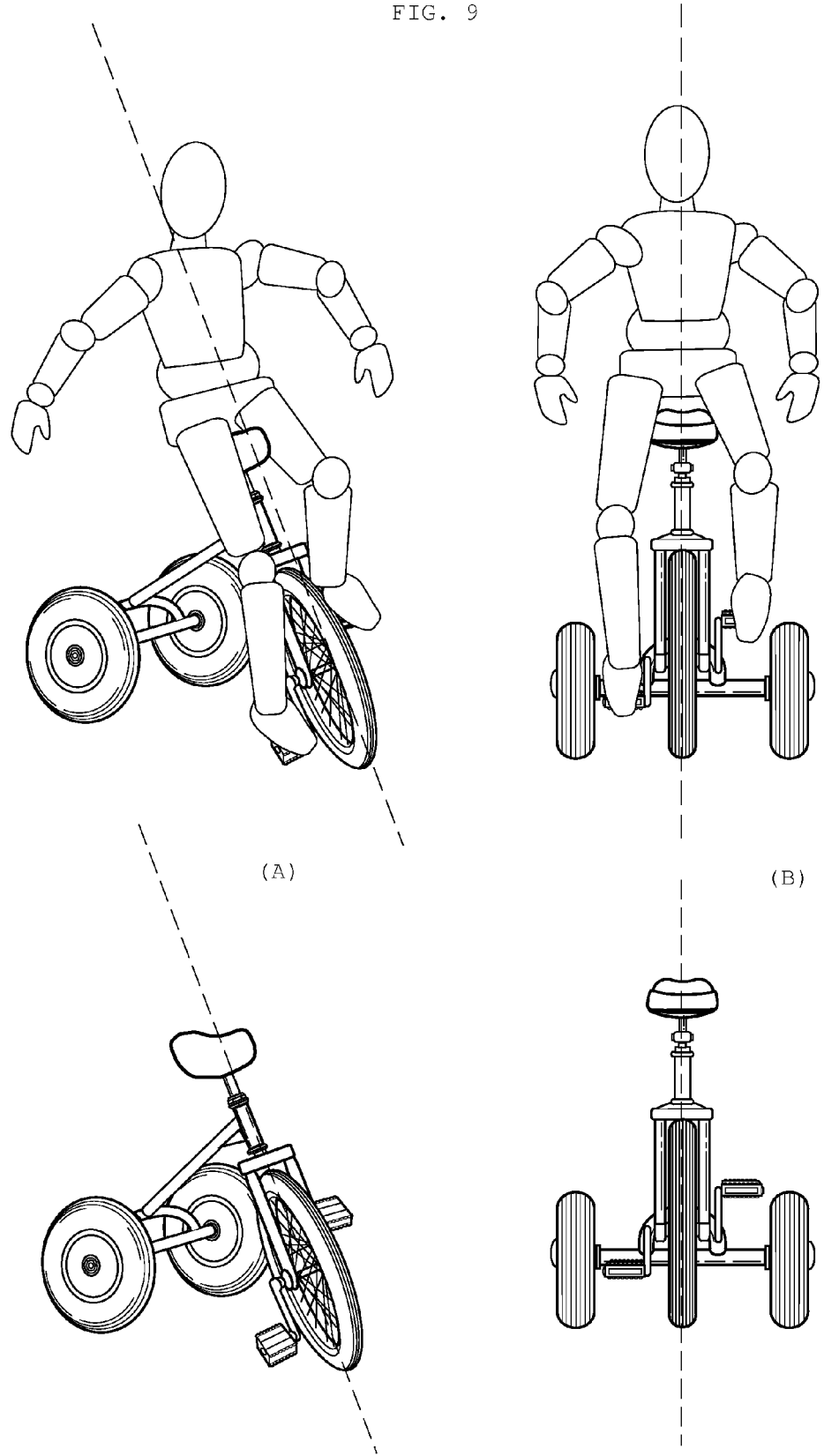
FIG. 9, parts (A) and (B), are views illustrating the effect of an automatic lean feature of the vehicle illustrated in FIGS. 1-6.

As illustrated in by FIG. 9, parts (A) and (B), when a rider of the vehicle illustrated in FIGS. 1-6 is seated and riding in a straight-forward direction, although he may be leaning forward, his body remains in a balanced upright position. When the rider turns the vehicle in the desired direction, the vehicle automatically (i.e., naturally and inevitably) causes the rider to lean into the direction of the turn. This automatic lean helps the rider maintain balance through the turn. If the vehicle did not cause the rider to lean into the direction of the turn, the rider would be urged off balance by his inertia and be more prone to tipping over. The rider does not lean to initiate turning, rather he twists his lower body to swivel the seat and front wheel into the desired direction and the vehicle automatically leans the rider into the turn, which helps him better maintain balance.

On a conventional tricycle, the rider is positioned on a seat that is rigidly attached to the rearward frame. When the rider of a conventional tricycle turns the handlebars to initiate the vehicle to turn, the vehicle does not lean into the direction of the turn, in contrast to the present embodiment. Although a conventional tricycle is inherently more stable while riding in straight (non-turning) direction than a conventional bicycle or unicycle due to the presence of three wheels defining a plane, conventional tricycles, especially motorized tricycles, are more prone to tipping over during turns because they do not lean.

Further, the rider of a conventional bicycle must himself lean into the turn to maintain balance. This is not an automatic function of the bicycle. Rather, it is the result of a learned skill by the rider. If the rider turns the bicycle's handlebars but does not lean into the turn, the rider's inertia will, during the turn, throw the rider off balance in the direction away from the turn.

The above-described automatic lean experienced by the rider of the present embodiment is a function not found in any other conventional bicycle, tricycle or unicycle. Further, the inventors did not expect this automatic lean, along with the advantageous handling characteristics that result from it.

What is claimed is:

1. A vehicle comprising:
   a front wheel;
   two rear wheels;
   a seat configured to allow a rider to lean forward when the vehicle travels; and
   a frame that includes a front frame section and a rear frame section, the front frame section extending from the seat to at least an axis of rotation of the front wheel and connecting the seat to the front wheel, the rear frame section extending from the front frame section rearward and connecting the rear wheels to the front frame section, the frame sections being pivotably connected at a pivot point between the front wheel and the seat.

2. The vehicle of claim 1, wherein the rear frame section includes:
   a pair of connection members respectively connecting a rear wheel to the front frame section; or
   a curved connection member extending rearwardly from the front frame section and a pair of auxiliary extension members connected to an end of the curved connection member distal from the front frame section, the rear wheels being respectively attached to ends of the auxiliary extension members.

3. The vehicle of claim 1, wherein a weight applied to the seat is unevenly distributed between the wheels with more weight applied to the front wheel.

4. The vehicle of claim 1, wherein frame sections pivot in a range of motion of 360 degrees with respect to each other.

5. The vehicle of claim 1, wherein the pivotable connection is above and aft the axis of rotation of the front wheel when the vehicle moves in a forward direction.

6. The vehicle of claim 1, wherein the seat is above the wheels and partially over the front wheel and a cylinder defined by circumferences of the two rear wheels, in a plan view relative to the seat.

7. The vehicle of claim 1, wherein the front wheel is in front of the vehicle when the vehicle travels in a forward direction, and wherein the pivotable connection is above the front wheel and between the axis of rotation of the front wheel and a longitudinal position of a center of gravity of the vehicle.

8. The vehicle of claim 1, wherein the pivotable connection is forward of a longitudinal center of gravity of the vehicle when the vehicle is traveling in a forward direction and aft of the center of gravity when the vehicle is traveling in a backward direction.

9. The vehicle of claim 8, wherein the position of the pivotable connection is fixed relative to the location of the center of gravity of the vehicle.

10. The vehicle of claim 1, wherein, when the vehicle travels in a forward or a rearward direction and a rider seated on the seat pivots to a direction, the front wheel turns toward that direction relative to the rear frame and the vehicle turns toward that direction 11. The vehicle of claim 1, wherein the front wheel is in front of the vehicle when the vehicle travels in a forward direction, and
wherein the pivotable connection is always above the front wheel and aft of the axis of rotation of the front wheel when the vehicle travels in a forward direction.

12. The vehicle of claim 1, wherein the front wheel is in front of the vehicle when the vehicle travels in a forward direction, and
wherein a location of the pivotable connection relative to a lateral location of the center of gravity is fixed and above the front wheel.

13. The vehicle of claim 1, wherein the front frame section is tilted rearwardly at a range of between 15 and 30 degrees from vertical.

14. A vehicle comprising:
a frame including a connection point to which a steering assembly is rotatably connectable, a first frame section extending away from the connection point, and a second frame section connected to the first frame section at an end opposite the connection point and to which a pair of wheels are connected; and
a steering assembly rotatably connected to the frame at the connection point and including
a seat configured to allow a rider to lean forward when the vehicle travels, and
a fork connected to a drive wheel and in a fixed relationship with the seat, the connection point being between the drive wheel and the seat,
wherein, when a rider seated on the seat drives the drive wheel the vehicle travels in a forward direction or a backward direction, and
wherein, when a torque is applied to the seat, the seat and drive wheel turn.

15. The vehicle of claim 14, wherein the seat is connected to the stem in a cantilevered manner.

16. A vehicle comprising:
a seat permitting a rider to lean forward when the vehicle travels and which is rotatable about an axis in response to an applied torque;
a fork section having a fork accommodating a main wheel and a stem extending from fork to the seat; and
a frame section having an articulation section movably connected to the stem at an end, a connection member extending from the articulation section away from the main wheel, and a shaft rigidly connected to the connection member at another end of the frame section, respective ones of a pair of auxiliary wheels being connected to opposing ends of the shaft,
wherein, when the seat is rotated, the main wheel rotates about the axis.

17. The vehicle of claim 16, wherein the articulation of the articulation section tilts into a direction of a turn.

18. The vehicle of claim 16, wherein, when the main wheel rotates about the axis, the vehicle automatically causes the rider to lean into the direction of the turn, which helps the rider maintain balance through the turn.

19. The vehicle of claim 1, wherein a longitudinal location of the pivot point is fixed relative to the front wheel.

* * * * *

UNITED STATES PATENT AND TRADEMARK OFFICE
CERTIFICATE OF CORRECTION

| | | |
|---|---|---|
| PATENT NO. | : 7,798,510 B2 | |
| APPLICATION NO. | : 11/905610 | |
| DATED | : September 21, 2010 | |
| INVENTOR(S) | : Scott Patrick Comstock and Joseph Comstock | |

It is certified that error appears in the above-identified patent and that said Letters Patent is hereby corrected as shown below:

In the Drawings, Sheet 2, Fig. 2, replace reference numeral "22" with --23--.

In the Specification, Column 3, lines 54-55, delete "have a respective" and replace with --have respective--;

Column 4, line 22, delete "connector at" and replace with --connector 22 at--;

Column 4, line 62, delete "as extends" and replace with --as it extends--;

Column 5, lines 36, 38, and 44, and Column 6, lines 55 and 59, each occurrence of "crank 22" should be --crank 23--;

Column 6, line 9, delete "a r" and replace with --an--;

Column 6, line 11, insert --of-- after "kind";

Column 6, line 12, delete the "T" appearing at the end of the line;

Column 7, line 23, delete "the this angle" and replace with --the angle--;

Column 7, line 41, delete "1 s" and replace with --1 is--;

Column 7, line 57, delete "have" and replace with --has--; and

Column 10, line 17, delete "to the stem in" and replace with --to a stem of the fork in--.

Signed and Sealed this
Seventh Day of February, 2012

David J. Kappos
*Director of the United States Patent and Trademark Office*